(No Model.)
H. L. & W. L. HARRIS.
GAS REGULATOR.
No. 344,654. Patented June 29, 1886.
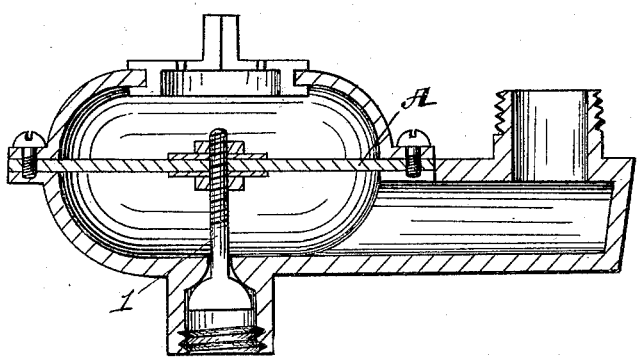
WITNESSES:
L. W. Shaw.
P. B. Turpin.
INVENTOR:
H. L. Harris
W. L. Harris
BY Munn & Co.
ATTORNEYS.

UNITED STATES PATENT OFFICE.

HARRY L. HARRIS AND WILLARD L. HARRIS, OF SAN FRANCISCO, CAL.

GAS-REGULATOR.

SPECIFICATION forming part of Letters Patent No. 344,654, dated June 29, 1886.

Application filed March 15, 1886. Serial No. 195,333. (No model.)

*To all whom it may concern:*

Be it known that we, HARRY L. HARRIS and WILLARD L. HARRIS, of San Francisco, in the county of San Francisco and State of California, have invented a new and useful Improvement in Gas-Regulators, of which the following is a description.

This invention is an improvement in that class of gas-regulators in which elastic diaphragms are used, such, for instance, as shown in the Patent No. 30,415, to Leffingwell; and the invention consists in the diaphragm formed of horse-hide treated with neat's-foot oil and beeswax.

In the drawing is represented in section a typical regulator provided with a diaphragm formed according to our invention.

The casing, inlet, and exit-port vent, valve, and valve-seat may be of any suitable construction. The diaphragm A may be secured in the case in any ordinary manner, and is connected with the valve by stem 1, as shown. This diaphragm is formed of horse-hide, which is treated with neat's-foot oil and beeswax. Such treatment renders the hide soft and elastic, so it may efficiently serve its mechanical purposes, and renders it impervious to moisture, so it will be in nowise injuriously affected by the action of the moisture caused by condensation of the vapors from the gas.

The diaphragm, treated as described, is simple and more durable than those now in use; simpler, because it is stronger, and requires no device for bracing the diaphragm proper, and more durable because of its greater strength and capacity of retaining its elasticity resulting in part at least from its property of resisting all deleterious action of the moisture, as before mentioned.

In more specifically defining our invention it may be said that the material employed is the finest of that known to the trade as "satin-finish" horse-hide, which is very durable and will retain its flexibility for a long time.

To one part of beeswax we add about nine parts of neat's-foot oil, and the mixture is boiled. When the mixture has partly cooled but is still warm, the diaphragm is passed through the solution.

Having thus described our invention, what we claim as new is—

A diaphragm for gas-regulators, consisting of horse-hide treated with neat's-foot oil and beeswax, substantially as and for the purposes specified.

HARRY L. HARRIS.
WILLARD L. HARRIS.

Witnesses:
L. DEXTER LYFORD,
F. O. YOUNG.